US008297593B2

(12) United States Patent
Muzzo et al.

(10) Patent No.: US 8,297,593 B2
(45) Date of Patent: Oct. 30, 2012

(54) VALVE, NAMELY FOR BOTTLES FOR ULTRA-HIGH PURITY GAS

(75) Inventors: Paul Muzzo, Yutz (FR); Paul Kremer, Helmsange (LU); Walter Grzymlas, Maizieres-les-Metz (FR)

(73) Assignee: Luxembourg Patent Company S.A., Luxembourg (LU)

( * ) Notice: Subject to any disclaimer, the term of this patent is extended or adjusted under 35 U.S.C. 154(b) by 641 days.

(21) Appl. No.: 12/443,518

(22) PCT Filed: Sep. 28, 2007

(86) PCT No.: PCT/EP2007/060294
§ 371 (c)(1),
(2), (4) Date: Mar. 30, 2009

(87) PCT Pub. No.: WO2008/037786
PCT Pub. Date: Apr. 3, 2008

(65) Prior Publication Data
US 2010/0001222 A1 Jan. 7, 2010

(30) Foreign Application Priority Data
Sep. 28, 2006 (EP) .................................... 06121465

(51) Int. Cl.
*F16K 1/02* (2006.01)
(52) U.S. Cl. ....................... 251/332; 251/335.2; 251/367
(58) Field of Classification Search ............... 251/335.2, 251/357, 367, 332–334
See application file for complete search history.

(56) References Cited

U.S. PATENT DOCUMENTS
1,662,291 A * 3/1928 Bastian ......................... 251/274
(Continued)

FOREIGN PATENT DOCUMENTS
BE 562 209 11/1957
(Continued)

OTHER PUBLICATIONS
International Search Report; PCT/EP2007/060294; Dec. 17, 2007.

*Primary Examiner* — John Bastianelli
(74) *Attorney, Agent, or Firm* — Cantor Colburn LLP

(57) ABSTRACT

A valve for pressurized or liquefied gas comprises a valve body (12) with a gas flow channel (16) and in this channel a sealing seat (30) for an open/close element (32) having a free end (60) where a shoulder (62) is provided. An annular seal (64) is mounted on the free end (60) of the open/close element (32), the annular seal (64) having a front end face (66) facing the sealing seat (30) and a rear end face (68) resting on the shoulder (62) of the open/close body. A holding ring (70) surrounds the annular seal (64) circumferentially and comprises a radial lip (72) that bears on the outer edge of the front end face (66) of said annular seal (64). The annular seal (64) includes an outer annular shoulder (74) on the edge of its front end face and the radial lip (72) with the holding ring (70) has an annular bead (76) facing this outer annular shoulder (74) of the annular seal (64). The holding ring (70) is fixed to the open/close element (32) by a leaktight outer circumferential weld (77), so that the annular bead (76) passes axially into the outer annular shoulder (74) of the annular seal (64) to compress it.

13 Claims, 3 Drawing Sheets

U.S. PATENT DOCUMENTS

| | | | | |
|---|---|---|---|---|
| 2,311,009 A | * | 2/1943 | Urquhart | 251/332 |
| 2,414,908 A | | 1/1947 | Smith | |
| 2,448,429 A | * | 8/1948 | Henry | 137/68.28 |
| 2,969,218 A | * | 1/1961 | Shaw | 251/333 |
| 3,085,783 A | * | 4/1963 | Pulling | 251/175 |
| 3,144,237 A | * | 8/1964 | Zurit et al. | 251/149.6 |
| 3,330,527 A | * | 7/1967 | Nurkiewicz | 251/114 |
| 3,511,475 A | * | 5/1970 | Pfau | 251/333 |
| 4,313,594 A | * | 2/1982 | Antoniw et al. | 251/357 |
| 4,607,822 A | * | 8/1986 | Schabert et al. | 251/334 |
| 4,671,490 A | | 6/1987 | Kolenc et al. | |
| 5,676,342 A | * | 10/1997 | Otto et al. | 251/38 |
| 5,881,997 A | | 3/1999 | Ogawa et al. | |
| 6,027,049 A | * | 2/2000 | Stier | 239/585.1 |

FOREIGN PATENT DOCUMENTS

| | | |
|---|---|---|
| DE | 11 10 483 | 7/1961 |
| DE | 12 09 831 | 1/1966 |
| EP | 0 727 603 | 8/1996 |
| GB | 2 224 335 | 5/1990 |

* cited by examiner

VALVE, NAMELY FOR BOTTLES FOR ULTRA-HIGH PURITY GAS

TECHNICAL FIELD OF THE INVENTION

The present invention concerns a valve, namely for bottles (or cylinders) of gas or liquefied gas. This valve is particularly well adapted for applications involving ultra-pure gases.

BRIEF DESCRIPTION OF RELATED ART

The increasingly widespread use of special gases and the high level of purity required today by certain industries has resulted in continual efforts by manufacturers of valve systems, valves and other equipment for gas distribution to improve the quality and the integrity of their products.

For the semiconductor industry, for example, distribution systems for high quality gas have been developed because the presence of impurities in the gas could irreparably affect the electrical properties of the components and consequently also diminish the production yields. Moreover, these gases are expensive, highly reactive, corrosive and/or toxic, and it is therefore essential to have reliable and suitable equipment.

In spite of these efforts, the design of certain valves that are conventionally used in applications requiring high purity is not considered to be completely satisfactory. A valve of this type comprises, for example a valve body with a gas flow channel, in which is arranged a sealing seat. The end of the lower stem acts as an obturating member and to this end comprises an annular seal made of polymeric material mounted in an annular groove. The annular groove is defined on the internal side by a free end of the lower stem and externally by a holding ring.

Two types of assemblies are generally employed to hold the seal. In a first case, the holding ring comprises on its side contacting the annular seal a series of teeth designed to encroach on the seal, thereby retaining it, the seal being inserted by force into the annular groove. Alternatively, the annular seal is positioned around the free end of the lower stem, and the ring is then fastened by screwing or setting to the lower stem such that it surrounds the annular seal on its periphery. In this case, the holding ring can comprise a radial lip that bears on the outer edge of the face of the polymer seal.

As previously mentioned, the high purity (HP) and ultra-high purity (UHP) applications imply heightened requirements in regard to purity and gas-tightness. However, in the designs mentioned above, the presence of teeth implies an abrasion of the seal, which would generate particles, and bring about dead spots (volumes not occupied by the seal). For a screwed ring, gas-tightness cannot be guaranteed at the threads, and any rubbing on the latter could also generate particles. Furthermore, when screwing the ring, this can exert torsional forces on the seal, which can deform it. Finally, on assembling by crimping, it is neither possible to guarantee a gas-tight assembly nor to precisely control the tenure of the annular seal.

Consequently, the present designs comprise dead zones and potential leakage zones, which are not wanted for applications involving pure and ultra-pure gases.

BRIEF SUMMARY OF THE INVENTION

The invention proposes a valve that is better adapted to the requirements of HP and UHP applications.

According to the invention, a valve for compressed or liquefied gas comprises a valve body equipped with a gas flow channel extending between an inlet and an outlet; and a first sealing seat in said gas flow channel. An obturating member coupled to the first sealing seat has a free end provided with a shoulder. An annular seal made of polymeric material is mounted on the free end of the obturating member, said annular seal having a front end face facing the first sealing seat and a rear end face resting on the shoulder of the open/close body. A holding ring fixed to the obturating member surrounds the annular seal circumferentially and comprises a radial lip that bears on the outer edge of the front end face of said annular seal. The obturating member can be moved axially towards the first seat in a first sealing position, in which the annular seal is pressed against the first seat such that it ensures the main gas-tightness (sealing) of the valve.

According to an important aspect of the invention, the annular seal includes an outer annular shoulder on the edge of its front end face, and the radial lip of the holding ring has an annular bead facing this outer annular shoulder of the annular seal. The holding ring is fixed to the obturating member by an outer, circumferential gas-tight weld, such that the annular bead penetrates axially into the outer annular shoulder of the annular seal to compress it.

In the valve according to the invention, the annular seal is therefore confined in an annular groove defined by the free end of the shoulder of the obturating member as well as the holding ring. This type of containment enables the creep/deformation of the annular seal to be controlled as it is compressed on the sealing seat.

Moreover, the annular bead provided on the radial lip of the holding ring permits the annular seal to be over compressed into the annular groove, thereby filling up the total space and obviating dead spots that could trap the gas. It should be noted here that the dimensions of the annular seal and the cavity are preferably chosen such that the compression forces are initially generated by the annular bead. Therefore, when the holding ring is mounted, the seal will be compressed by the annular bead. Another advantage of the annular bead is that it punctually creates an important compression zone with the annular seal and forms a gas-tight/sealing barrier.

Finally, the fixation by welding on the totality of the circumference and in a gas-tight manner constitutes a guarantee of gas-tightness at the back of the annular seal which cannot be affected by crimping or screwing. For practical reasons and on the grounds of precision and thermal control, lasers are particularly preferred for the welding operation. The weld can be made with or without the supply of material. Other welding techniques that allow the realisation of precise welds can also be employed, such as by electron beams. It should also be noted that fixing the holding ring by welding provides a simple assembly of the ring onto the body of the obturating member essentially without imposing any stress on the annular seal—apart from the stresses generated by the annular bead—consequently avoiding any damage during assembly.

According to one embodiment, the free end of the obturating member includes a radial projection of the end which penetrates radially into an internal annular shoulder of the annular seal. The free end of the obturating member can be truncated in shape that reduces in size from the shoulder towards the radial projection. This radial projection of the end has two purposes: (1) when the annular seal is assembled, it holds it in place; (2) once the holding ring is welded, it produces a gas-tight barrier effect similar to that obtained with the annular bead on the lip of the holding ring. In this variant, the annular seal is therefore confined in the annular groove that comprises at its entrance two gas-tight barriers to prevent any gas passing towards the back of the annular seal.

Preferably, the circumferential external weld between the holding ring and the obturating member is realised axially and set back with respect to the shoulder. To that end, the obturating member can comprise a peripheral annular shoulder, on which the annular seal leans, but axially set back with respect to this, the holding ring being then welded to the obturating member at this peripheral annular shoulder. This axial offset enables welding to be carried out at a certain distance from the seal thereby ensuring that the heat does not damage it.

The valve body advantageously comprises a second sealing seat surrounding the channel, the obturating member being able to be moved axially past the first sealing position into a second sealing position, in which said free end comes to be seated on this second seat such that a metallic seal is made with said second seat. The presence of this second seat is particularly of interest for UHP applications where the gases are expensive and often toxic as it enables the valve to be closed by a metallic seal, even if the annular seal is damaged or dislodged (by abrasion or by excessively high tightening forces), or disappears (e.g. due to a fire).

One can understand that a second sealing seat of this type is normally designed such that the first sealing seat surrounds it, and the part of the free end sitting on the second sealing seat has a transverse cross section greater than the cross section of the gas channel at said second sealing seat.

In practical terms, the axial displacement required to switch the obturating member from the first sealing position to the second sealing position is designed to be less than 0.3 mm, preferably about 0.1 mm.

The obturating member is usually commanded by means of a control piece comprising an axial control stem that transmits at least one axial activating force to the obturating member. The control piece can be of the manual control or automatic type (e.g. pneumatic or with a solenoid).

According to one embodiment, the obturating member comprises an axial stem portion for moving it, and which can be an integral part of the control stem of the control piece or be connected to it. A separable rigid connection between the control stem and said axial stem portion of said obturating member is preferred due to its ease of use.

Consequently, the valve according to the invention proves to be particularly advantageous for ultra-high purity applications, in particular because of the good gas-tightness of its obturating member without dead volumes. For use as a valve of a gas bottle, the valve body is designed to be fixed onto a bottle and the opening of the entrance of the flow channel typically opens into the interior of the bottle. However, the present valve can also be used as a release valve/tap in a system for (fluid) gas distribution. In this case, the valve body is preferably modified such that the inlet and outlet openings can be connected to the pipes or other elements of the gas distribution system.

BRIEF DESCRIPTION OF THE DRAWINGS

Other distinguishing features and characteristics of the invention will emerge from the detailed description of an advantageous illustrative embodiment presented below, on referring to the appended drawings. They show.

DETAILED DESCRIPTION OF THE INVENTION

Figure 1:
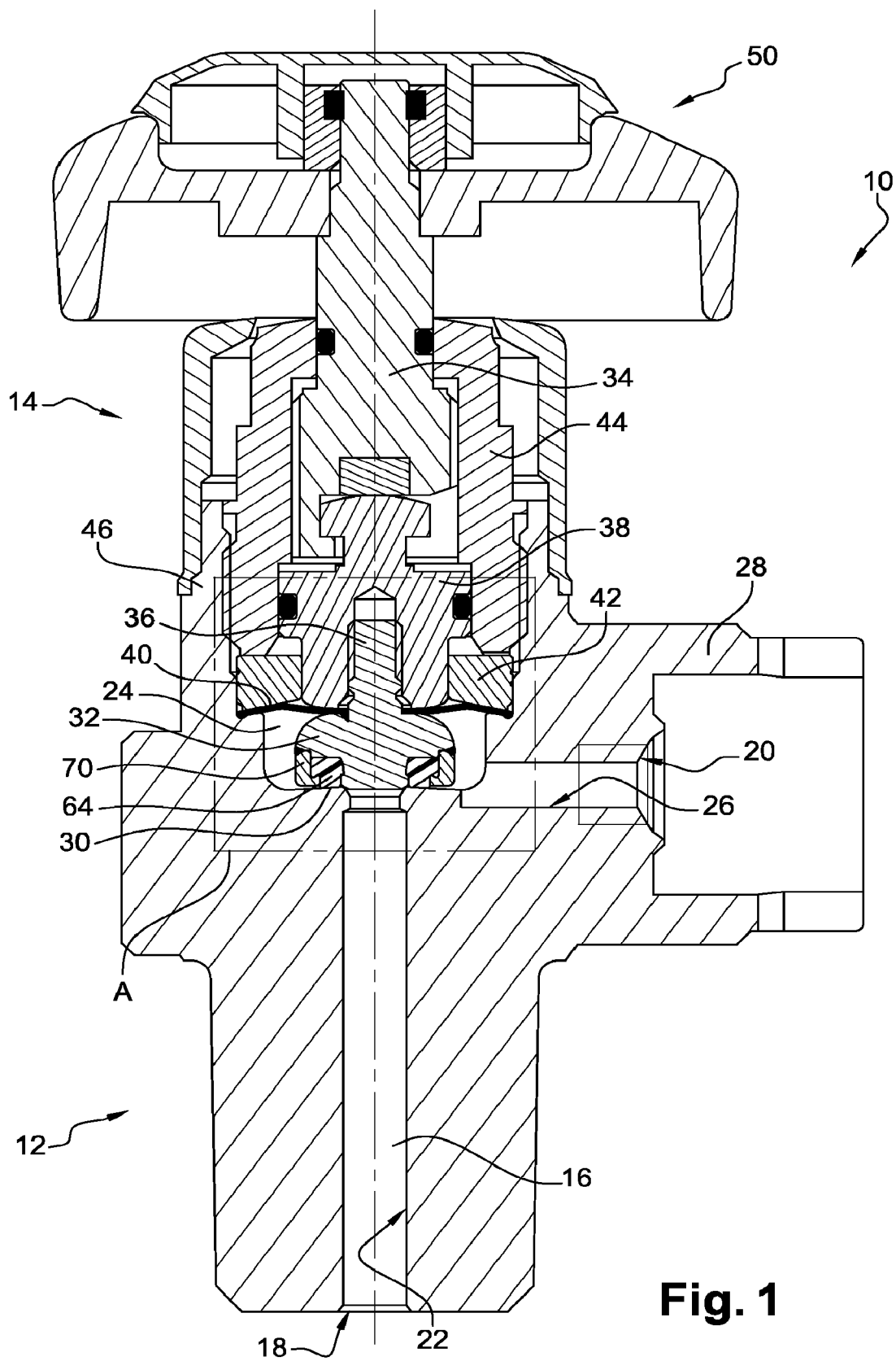
FIG. 1: a longitudinal cross section of a preferred embodiment of a valve according to the invention, in a principal sealed position of the obturating member.

FIG. 1 represents a longitudinal cross section of a preferred variant of the present valve 10, which comprises a valve body and a manual control piece each designated respectively 12 and 14. The valve body 12 is designed to be screwed on a gas bottle (not shown) and comprises a gas flow channel 16 extending between a gas inlet 18 and a gas outlet 20.

In the present execution, the flow channel 16 is formed by an entrance channel 22 connecting the entry inlet 18 to the chamber of the valve 24 and an outlet channel 26 connecting the valve chamber to the exit outlet 20. The entry channel 22 passes through the lower part of the body 12 that is provided with a thread (not shown) that enables the valve to be screwed onto the bottle. The exit channel 26 leads to a part that forms connection 28.

The end of the entry channel 22 arriving in the chamber 24 is surrounded by a first sealing seat 30 comprising an annular gas-tight seal, with which cooperates an obturating member 32 that, depending on its axial position, permits the flow towards the exit channel 26 or closes the inlet channel 22 in a gas-tight manner and therefore prevents any flow through the passage 16. As explained previously, the obturating member 32 is moved in the axial direction by means of a control stem 34 of the control piece 14 which is connected to a part of the stem 36 of the obturating member 32 through an intermediate stem 38.

Figure 3:
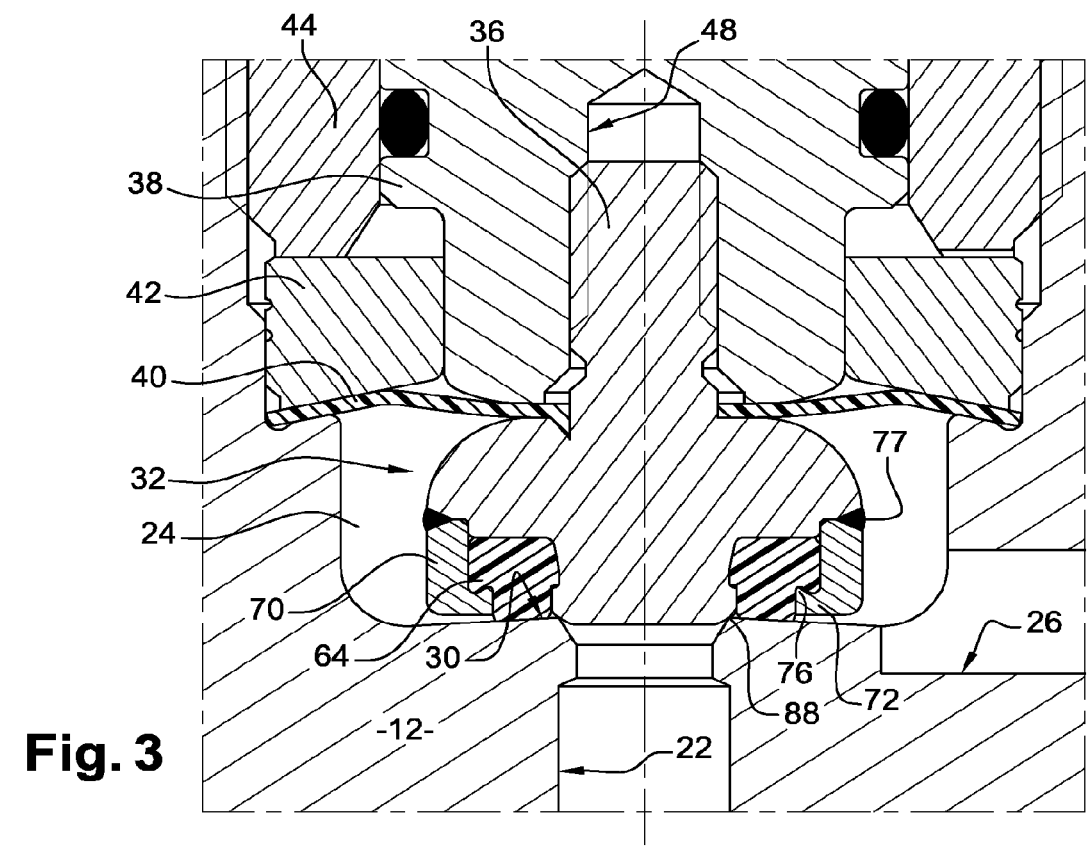
FIG. 3: an enlarged view of A.

The chamber 24 is sealed from the control piece 14 in a conventional manner by a flexible (plastic or metallic) membrane 40. As can be seen in FIGS. 1 and 3, this membrane 40 surrounds the part of the stem 34 and extends as far as the periphery of the chamber 24, where it is held by a setting 42, itself held by a sealing gland 44 solidly fixed by being screwed into a bore 46 of the valve body 12.

As the activation of the obturating member is conventional, it will only be briefly described. The part of the stem 36 comprises an external thread by which it is screwed onto a thread of the internal surface of a recess 48 of the intermediate stem 38. The intermediate stem 38 is itself connected to the lower end of the control stem 34 such that it is in solidarity with the axial movement of the control stem but not rotationally. The control stem 34 comprises an external thread that cooperates with an internal thread in the sealing gland 44. A wheel 50 is fixed on the upper end of the control stem 34. Depending on the direction of rotation of the wheel, the control stem moves upwards or downwards on the thread of the sealing gland 44, thereby causing the axial displacement of the obturating member 32 that comes closer or moves away from the sealing seat 30.

Figure 2:
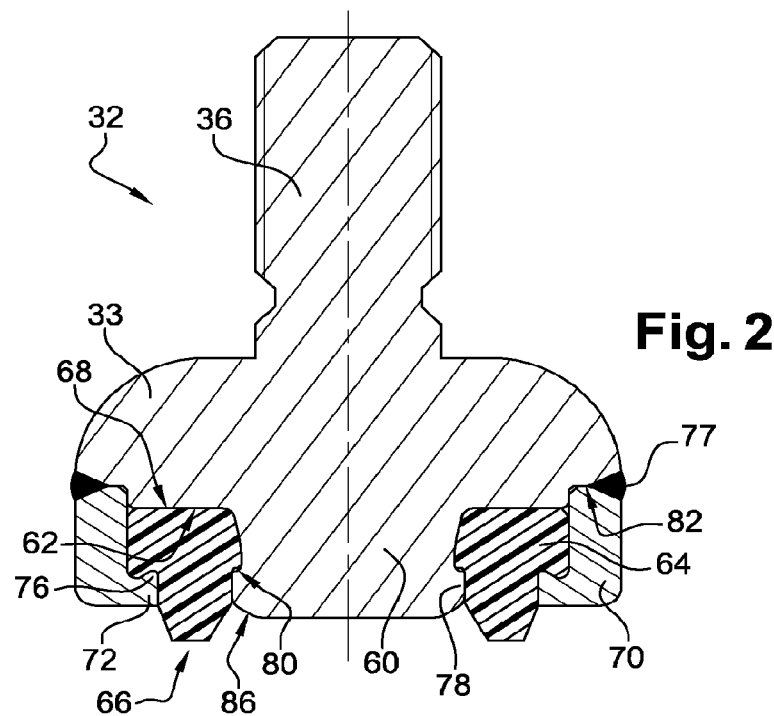
FIG. 2: a longitudinal cross section of the obturating member.
Figure 4:
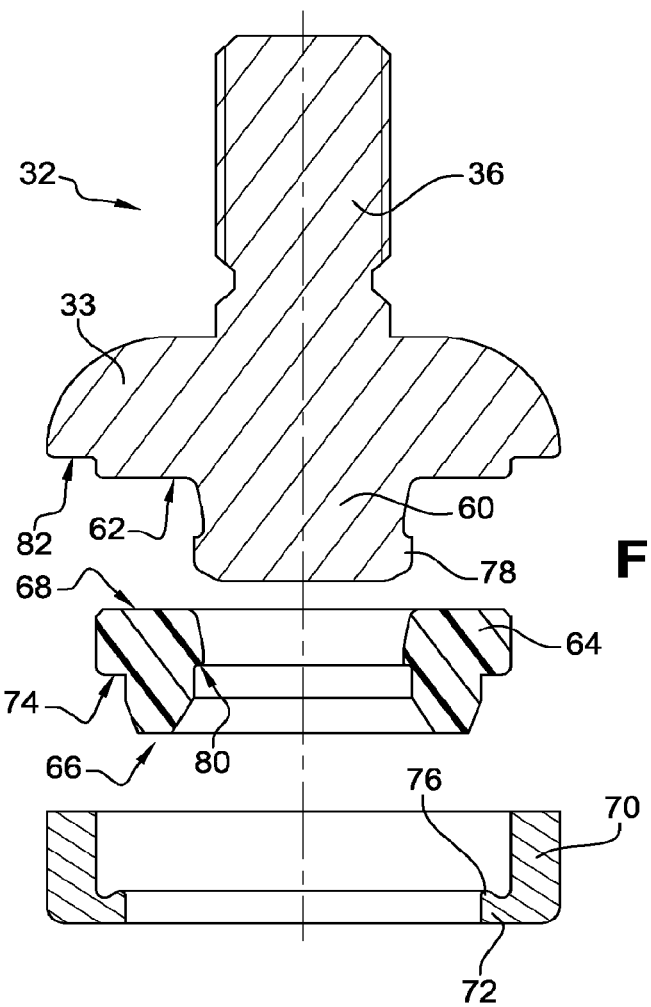
FIG. 4: an exploded view of the cross section of the obturating member.

On referring more particularly to FIGS. 2 and 4, it can be appreciated that the obturating member 32 comprises a body 33 with a free end 60 and a shoulder 62. An annular seal 64 (also called disc) made of polymeric material is mounted around this free end 60; the annular seal 64 has a front end face 66 facing the first sealing seat 30 and a rear end face 68 resting on the shoulder 62 of the open/close body 32. A holding ring 70 surrounds the annular seal 64 circumferentially and comprises a radial lip 72 that bears on the outer edge of the front end face 66 of the annular seal 64. It should be recognised in particular that the annular seal 64 comprises an outer annular shoulder 74 on the edge of its front end face 66, and that the radial lip 72 of the holding ring 70 has an annular bead 76 facing the outer annular shoulder 74 of the annular seal 64. The holding ring 70 is fixed to the obturating member 32 by an outer circumferential gas-tight weld 77, such that the annular bead 76 penetrates axially into the outer annular shoulder 74 of the annular seal 64 to compress it.

The obturating member 32 therefore comprises an annular disc 64 confined in an annular groove defined by the free end 60, the shoulder 62 and the holding ring 70 which enables the disc to be well maintained when it is compressed on the sealing seat 30, thereby forming the principle seal of the valve (in a first sealing position). In fact, as can be seen in FIG. 3, when the annular seal is pressed onto the sealing seat 30 it is well maintained at the narrowed exit of the annular groove between the radial lip 72 and the free end 60.

Figure 5:
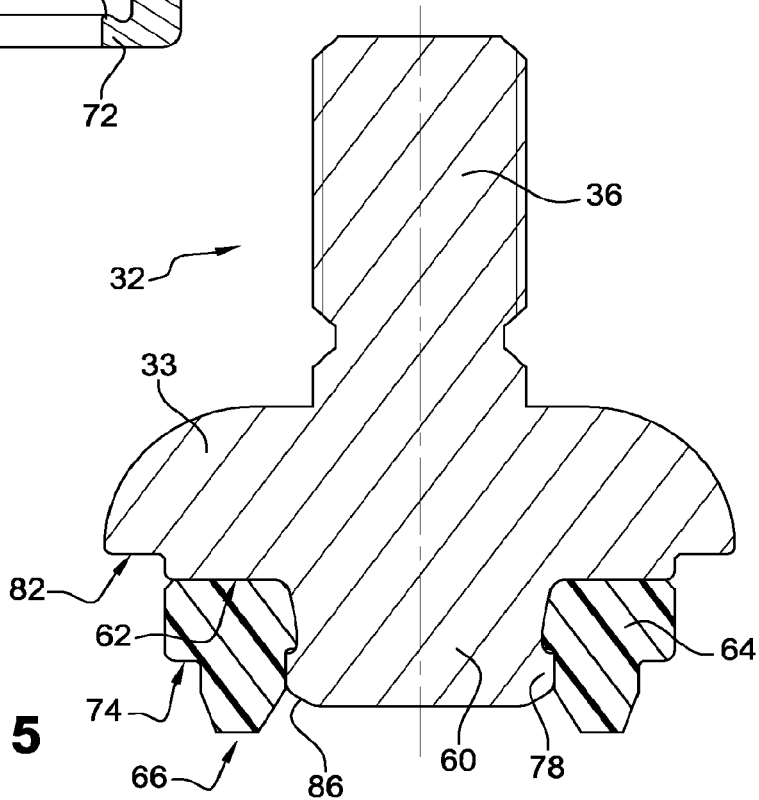
FIG. 5: a cross sectional view of the obturating member without the holding ring.

The design of the obturating member further guarantees an improved gas-tightness. Firstly, the annular bead 76 provided on the radial lip 72 of the holding ring 70 permits the annular seal 64 to be over compressed into the annular groove, thereby filling up the total space. The dimensions of the annular seal 64 and the annular groove are preferably chosen such that the compression forces are initially generated by the annular bead 76 when it is put in place. This aspect will be better understood by referring to FIGS. 4 and 5. In practical terms, the annular seal has an initial shape (transverse cross section) basically corresponding to that of the annular groove, in which it will be confined, after the holding ring 70 has been mounted. The annular seal is then slipped on the free end 60 of the body 33 such that its back frontal side 68 bears onto the shoulder 62. The presence of a radial projection of the end 78 is observed which radially penetrates into an internal annular shoulder 80 of the annular seal 64, of which one of the functions is to retain the annular seal 64 around the free end 60 during assembly. The higher sharp ridge of the radial projection 78 is provided so as to grip the seal 64 that is subject to an axial displacement towards the bottom, and to better retain it.

The holding ring is then positioned on the body 33 of the obturating member and welded. In order to do this, the ring is pushed axially upwards (as seen in the layout of FIG. 4) to bring it up against the body 33 and thus make the bead 76 penetrate into the shoulder 74 of the annular seal 64. The deformation/pressure caused by this bead when the ring is put in place generates an over compression of the seal 64 in the annular groove and forces it to wholly adopt the internal volume of the groove, thereby eliminating the dead spaces.

Another effect of the annular bead 76 is that it punctually creates an important compression zone with the annular seal 64 and thereby forms a gas-tight barrier.

The holding ring 70 is welded on the totality of its circumference in order to ensure a solid and gas-tight fixation to the body 33 of the obturating member 32. This weld therefore seals off the zone behind the annular seal 64 in a gas-tight manner, which could not be obtained by means of a screwed on ring or a crimped on ring.

For reasons of precision and from thermal considerations, the weld is preferably realised by means of a laser. In order to avoid the annular seal being damaged by the heat during welding, the weld is realised axially and set back with respect to the shoulder 62. As can be seen in the Figures, the external circumferential weld is carried out at a peripheral annular shoulder 82 of the body 33 surrounding the shoulder 62 but which is axially set back with respect to said shoulder 62.

Finally, the top sharp ridge of the radial projection 78 also produces a gas-tight barrier effect similar to that obtained with the bead 76 once the ring 70 is put in place.

This design guarantees an excellent gas-tight seal of the obturating member 32 because the holding ring 70 is welded tight and the two gas-tight barriers prevent the gas from flowing towards the rear of the seal 64. Moreover, this configuration prevents a gas pressure from forming behind the annular seal 64 that would tend to extrude said seal out of the annular groove.

Referring once more to FIG. 3, it can be observed that the lower edge of the radial projection 78 is designed as a preferably conical, annular sealing surface 86 so as to form a second seal (metal/metal) when it is seated on a second sealing seat 88 (FIG. 3) surrounding the channel 16, by axially displacing the obturating member into a second sealing position beyond the first sealing position in which the seal is realised between the seal 64 and the seat 30. As can be seen, the second sealing seat 88 is surrounded by the first seat 30 and comprises a gas-tight surface shaped like a rounded ridge.

To bring the obturating member from the first sealing position to the second sealing position, one can make provision for an axial displacement of less than 0.3 mm, preferably about 0.1 mm.

This second seal proves to be particularly advantageous in the sense that it guarantees a gas-tight closure of the valve, even in the case of damage or when the seal disappears (for example after a fire).

The annular seal is made of polymeric material, preferably a thermoplastic polymer having low gas permeability and a low creep at high pressures. In particular, the annular seal can be made of: PCTFE, Vespel® (Dupont), RULON® (Saint-Gobain), PVDF.

The invention claimed is:

1. Valve for bottles of pressurised or liquefied gas, comprising:
    a valve body comprising a gas flow channel;
    a first sealing seat in said gas flow channel;
    an obturating member having a free end provided with a shoulder;
    an annular seal mounted on said free end of the obturating member, said annular seal having a front end face facing said first seat and a rear end face resting on said shoulder of said obturating member; wherein said free end of said obturating member comprises a radial end projection penetrating radially into an internal annular shoulder of said annular seal, said free end being tapered, narrowing from said shoulder in the direction of said radial projection;
    a holding ring circumferentially surrounding said annular seal and comprising a radial lip that bears on the outer edge of said front end face of said annular seal;
    said obturating member being able to be moved axially towards said first seat into a first sealing position, in which said annular seal is pressed against said first seat such that it ensures the main gas-tightness of the valve;
    wherein
    said annular seal comprises an external annular shoulder encircling its front end face;
    said radial lip of said holding ring carries an axially protruding annular bead facing said external annular shoulder of said annular seal; and
    said holding ring is fixed to the obturating member by an external circumferential gas-tight weld, such that said annular bead penetrates axially into said external annular shoulder of said annular seal to compress it.

2. Valve according to claim 1, wherein, said circumferential external gas-tight weld between the holding ring and the obturating member is axially set back with respect to said shoulder of the obturating member.

3. Valve according to claim 2, wherein the obturating member comprises a peripheral annular shoulder surrounding said shoulder but axially set back with respect to it; and the holding ring is welded to the obturating member at this peripheral annular shoulder.

4. Valve according to claim 1, wherein the circumferential external gas-tight weld is realised by a laser.

5. Valve according to claim 1, wherein the valve body comprises a second sealing seat surrounding said channel, said obturating member being able to be moved axially beyond said first sealing position into a second sealing position, in which said free end comes to be seated on said second sealing seat such that a metallic seal is made with said second sealing seat.

6. Valve according to claim 5, wherein the first sealing seat surrounds the second sealing seat.

7. Valve according to claim 5, wherein the part of the free end sitting on the second sealing seat has a transverse cross-section greater than the cross-section of the gas flow channel at the level of said second sealing seat.

8. Valve according to claim 5, wherein the axial displacement required to switch the obturating member from the first sealing position to the second sealing position is less than 0.3 mm.

9. Valve according to claim 1, comprising a control head mounted on said valve body and comprising an axial control stem for transmitting at least one axial actuating force to said obturating member.

10. Valve according to claim 1, wherein the obturating member comprises an axial stem portion for its movement.

11. Valve according to claim 10, comprising a separable rigid coupling between the control stem and said axial stem portion of said obturating member.

12. The valve according to claim 1, wherein said valve is configured as a valve for a bottle or as a flow valve in a gas distribution channel for ultra-high purity gas.

13. Valve according to claim 5, wherein the axial displacement required to switch the obturating member from the first sealing position to the second sealing position is less than 0.1 mm.

* * * * *